United States Patent [19]
Ishii

[11] Patent Number: 5,934,846
[45] Date of Patent: Aug. 10, 1999

[54] CHUCK

[76] Inventor: Masato Ishii, 10482, Takayama-cho, Ikoma-shi, Nara-ken, Japan, 630-0101

[21] Appl. No.: 09/204,537

[22] Filed: Dec. 3, 1998

[30] Foreign Application Priority Data

Jun. 30, 1998 [JP] Japan .................... 10-183193

[51] Int. Cl.$^6$ ...................... B23Q 5/22
[52] U.S. Cl. .............. 408/141; 279/22; 279/75; 279/81; 408/238; 408/239 A
[58] Field of Search ............... 279/16, 22, 71, 279/75, 81, 82; 408/141, 238, 239 R, 239 A

[56] References Cited

U.S. PATENT DOCUMENTS

| | | | |
|---|---|---|---|
| 4,502,824 | 3/1985 | Dohse et al. | 409/234 |
| 5,352,074 | 10/1994 | Ishikawa | 408/239 A |
| 5,558,478 | 9/1996 | Odendahl et al. | 408/226 |
| 5,716,173 | 2/1998 | Matsumoto | 408/239 A |

*Primary Examiner*—Andrea L. Pitts
*Assistant Examiner*—Monica Smith
*Attorney, Agent, or Firm*—Wenderoth, Lind & Ponack, L.L.P.

[57] ABSTRACT

A chuck capable of rapidly sensing trouble occurring during work is provided. The chuck comprises a base body for rotating with a spindle of a machine tool; a concave hole disposed in a stem of the base body and open at the end surface thereof; a holder inserted in the concave hole with a pressing force applied thereto in a direction of ejection, the holder being capable of holding an appropriate cutting tool A on the end thereof; a transfer mechanism for permitting a predetermined length of slide of the holder into the base body and for transferring the rotation of the base body to the holder; and an appropriate lock mechanism for maintaining the holder fitted in the base body against the pressing force, the lock mechanism being capable of unlocking the fitted holder. The trouble is sensed by maintaining the fitted holder.

9 Claims, 7 Drawing Sheets

CHUCK

BACKGROUND OF THE INVENTION

1. Field of the Invention

This invention relates to a chuck which can detect when trouble occurs during working by various cutting edge tools.

2. Description of the Prior Art

Conventional tap work is accomplished by feeding an amount of tap pitch per revolution of a main spindle while causing the tap to bite into a prepared hole thereby working to a predetermined depth.

At this time, a provision is made for the case where a correct amount of pitch per revolution of the tool main spindle cannot be fed. That is, when the tool main spindle has a great feed per revolution, the tap moves to a compression side. Meanwhile, when the tool main spindle has little feed per revolution, the tap moves to a tension side. In this manner, the work is carried out.

Prior to an initial work operation, the tap always waits at a neutral position.

A high load could allow a torque limiter to operate, thereby preventing the tap from being damaged. However, when the torque limiter operates, many vibrations and impacts are generated due to its mechanism. These vibrations and impacts shorten the tap life. Moreover, as the tap is worn and then its life comes closer to the end, it is difficult for the top to bite into the prepared hole. Thus, since the work is carried out by the as compressed tap, a tap depth is reduced.

Moreover, the plucking of a thread would result in defectives.

Then, the tool main spindle is reversely revolved so as to pull out the tap. Thereby, the above-described compressed tap necessarily returns to its original position due to the tension for the subsequent work operation.

According to a working method as described above, the tap, which is shrunk due to an undesirable influence during the work operation, is restored to its original condition by the tension before entering the subsequent work. Thus, the length (overall length) of the tap from one end to the other end is fixed at the time of the initial work operation. It is not therefore possible to visually detect when trouble with the work operation occurs.

Thus, even if the trouble is sensed by an intermediate sampling inspection or the like, many workpieces which have been processed before the trouble is sensed are defective. The rework or the like results in a considerably high product cost and also yields bad productivity.

It is contemplated that an automatic detecting device such as a touch sensor can be used together with the tap. However, only the breakage of the tap is detected. It is impossible to sense that the tap depth is shallow and the plucking of the tap thread causes the defective workpieces.

Moreover, for cutting the workpiece by the use of a cutting edge tool such as a cutter, a drill or a reamer, the tool main spindle rotates and reciprocates the cutting edge tool in a chuck by a predetermined length.

However, the trouble is caused due to the life of the cutting edge tool, a working condition, a working environment or the like. If the cutting work is continued with the trouble caused, the defective workpieces (with a rough cut surface, for example) are produced.

For sensing these defective workpieces, they are discovered sampling detection of the workpieces, or the like, is carried out. Many workpieces which have been worked prior to the detection are defective. The rework or the like causes the product cost to significantly rise and also yields bad productivity.

It can be also contemplated that the automatic detecting device such as the touch sensor is used together with the tap. However, only the breakage of the cutting edge tool or the like is detected. A faulty cut surface or the like cannot be sensed.

An object of this invention is therefore to provide a chuck which can rapidly sense the trouble occurring during the work operation.

SUMMARY OF THE INVENTION

In order to achieve the above object, this invention provides a chuck which comprises: a base body for rotating with a spindle of a machine tool; a concave hole disposed in a stem of the base body and opened at the end surface thereof; a holder inserted in the concave hole with a pressing force applied thereto in a direction of ejection, the holder adapted for holding an appropriate cutting tool on the end thereof; a transfer mechanism for permitting a predetermined length of slide of the holder into the base body and for transferring the rotation of the base body to the holder; and an appropriate lock mechanism for maintaining the holder fitted in the base body against the pressing force, the lock mechanism capable of unlocking the fitted holder.

This invention also provides a chuck which comprises: a base body for rotating with a spindle of a machine tool; a concave hole disposed in a stem of the base body and open at the end thereof; a cylindrical body slidably inserted in the concave hole; a transfer engagement mechanism for permitting a constant slide of the cylindrical body into the base body and for transferring the rotation of the base body to the cylindrical body; a holder for slidably fitting into the concave hole from the end of the cylindrical body and for holding an appropriate cutting tool on the end thereof; a transfer mechanism for permitting a predetermined length of slide of the holder into the cylindrical body and for transferring the rotation of the cylindrical body to the holder; a first spring disposed in a distal end of the holder so that it can receive an applied pressure from the distal end side of the holder; an appropriate lock mechanism for maintaining the holder fitted in the cylindrical body against a compression force of the first spring, the lock mechanism capable of unlocking the fitted holder; a protruding member protruding from an inside of the cylindrical body toward the distal end of the holder, the protruding member having the protruding end in contact with the first spring on the side at which the first spring receives the applied pressure; and a second spring for pushing the cylindrical body back to a bottom side of the concave hole.

This invention further provides a chuck which comprises: a base body for rotating with a spindle of a machine tool; a concave hole disposed in a stem of the base body and open at the end thereof; a cylindrical body slidably inserted in the concave hole; a transfer engagement mechanism for permitting a constant slide of the cylindrical body into the base body and for transferring the rotation of the base body to the cylindrical body; a permitting section disposed in the base body so that the transfer engagement mechanism can slide in a constant range toward the distal end of the cylindrical body; a holder for slidably fitting into the concave hole from the end of the cylindrical body and for holding an appropriate cutting tool on the end thereof; a transfer mechanism for permitting a predetermined length of slide of the holder into the cylindrical body and for transferring the rotation of the cylindrical body to the holder; a first spring disposed in the distal end of the holder so that it can receive an applied pressure from the distal end side of the holder; an appropriate lock mechanism for maintaining the holder fitted in the cylindrical body against a compression force of the first spring, the lock mechanism capable of unlocking the fitted holder; a protruding member protruding from an inside of the cylindrical body toward the distal end of the holder, the protruding member having the protruding end in contact with the first spring on the side at which the first spring receives the applied pressure; a second spring for pushing the cylindrical body back to a bottom side of the concave hole; and a third spring for pushing back the cylindrical body in the direction in which the protruding member protrudes.

Furthermore, the transfer mechanism may have a function of attaching and detaching the holder.

BRIEF DESCRIPTION OF THE DRAWINGS

FIGS 7(I), 7(II) and 7(III) show functioning of a lock mechanism as illustrated in FIGS. 1–4;

DETAILED DESCRIPTION OF THE PREFERRED EMBODIMENTS

Figure 1:
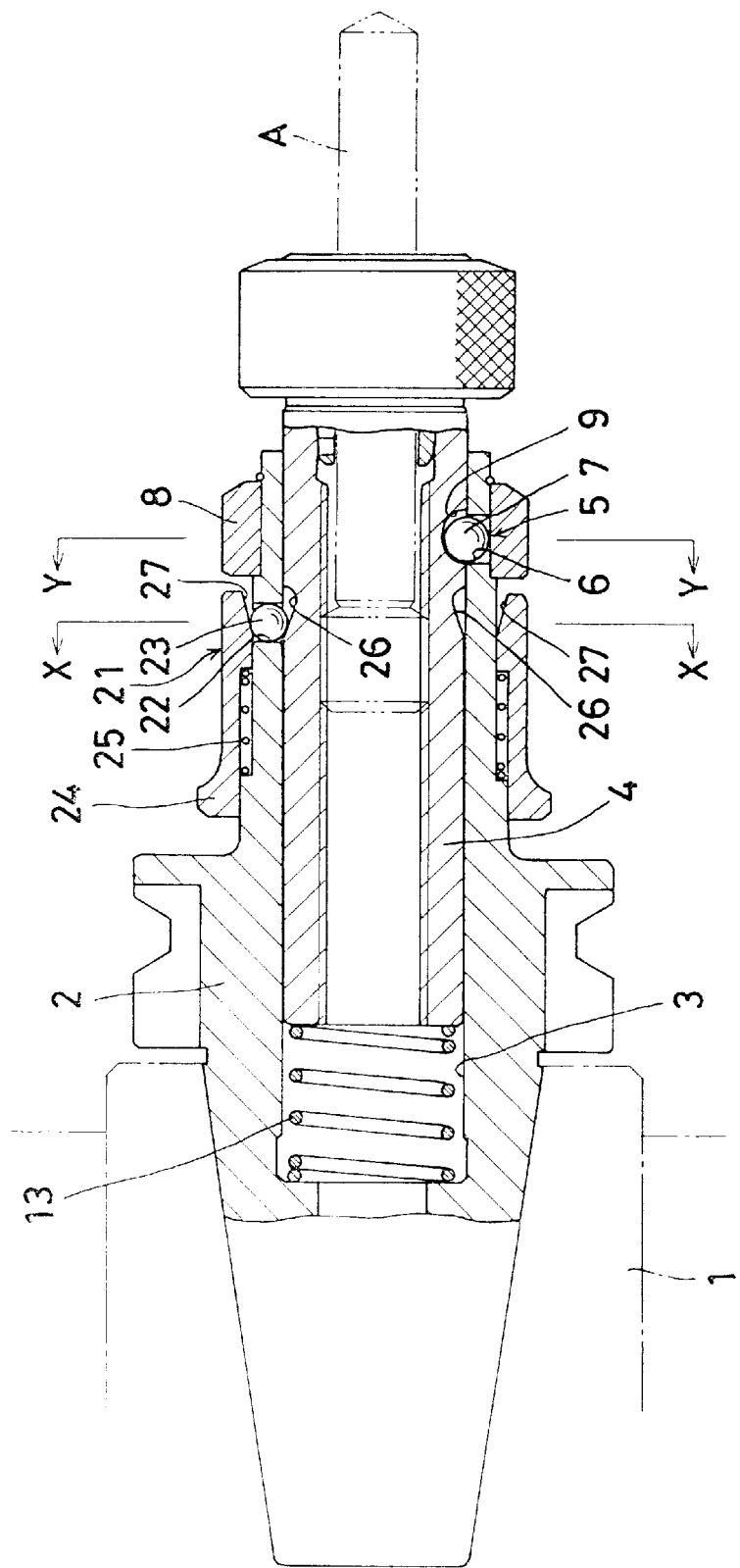
FIG. 1 is a vertical sectional side view showing a first embodiment of a chuck according to this invention.
Figure 2:
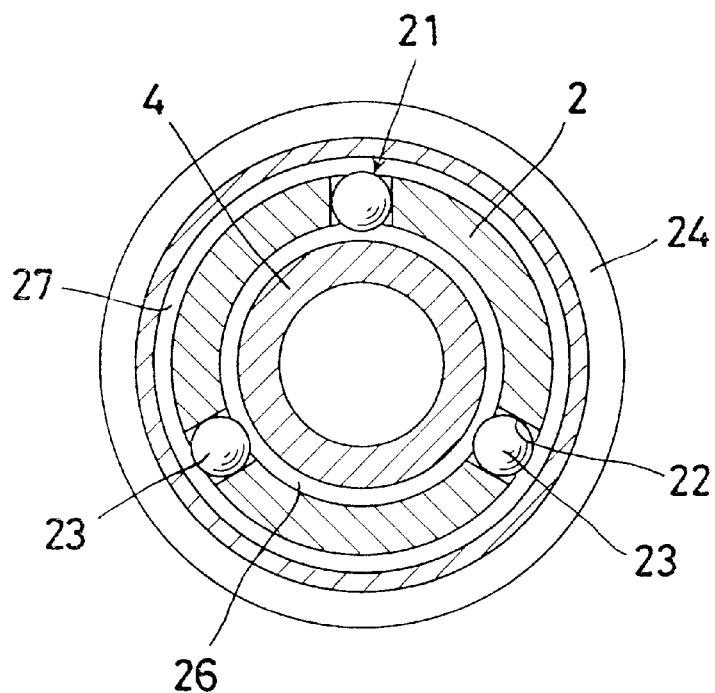
FIG. 2 is a cross sectional view taken along line X—X of FIG. 1.

Embodiments of this invention will be described with reference to the accompanying drawings.

In a first embodiment of this invention, as shown in FIGS. 1 through 5, a concave hole 3 having an open end surface is included in a stem of a base body 2 which rotates with a spindle 1 of a machine tool.

A holder 4 for holding an appropriate cutting tool A on the end thereof is slidably inserted in this concave hole 3.

The above-described cutting tool A is not limited to the illustrated drill bit. The cutting tool A may be a tap, a reamer, an end mill cutting edge tool or the like.

The base body 2 includes a transfer mechanism 5 for permitting a predetermined length of the holder 4 to slide into the base body 2 and for transferring the rotation of the base body 2 to the holder 4.

Figure 3:
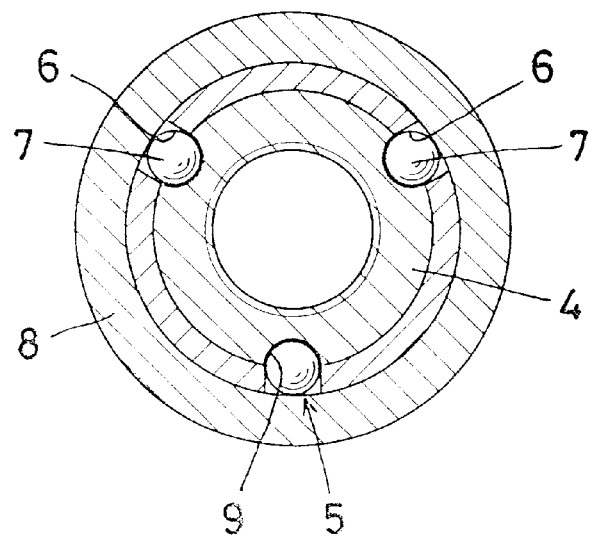
FIG. 3 is a cross sectional view taken along line Y—Y of FIG. 1.

As shown in FIGS. 1 and 3, for example, the above-mentioned transfer mechanism 5 comprises through holes 6 communicating with the concave hole 3 from their positions equally spaced on an outer peripheral surface of the base body 2; balls 7 fitted in the through holes 6; a rotating cylinder 8 freely rotating at a fixed position defined by a stage portion and a capture ring at the outer periphery of a part of the base body 2 having the balls 7; and concavities 9 which are arranged so that a partial peripheral surface of a ball 23 may be fitted into the outer peripheral surface of the holder 4. The transfer mechanism 5 transfers the rotation of the base body 2 to the holder 4 through the balls 7.

Each concavity 9 is shaped into an ellipse whose longitudinal axis is parallel to an axis of the base body 2 so as to permit the holder 4 to slide into the base body 2.

Figure 4:
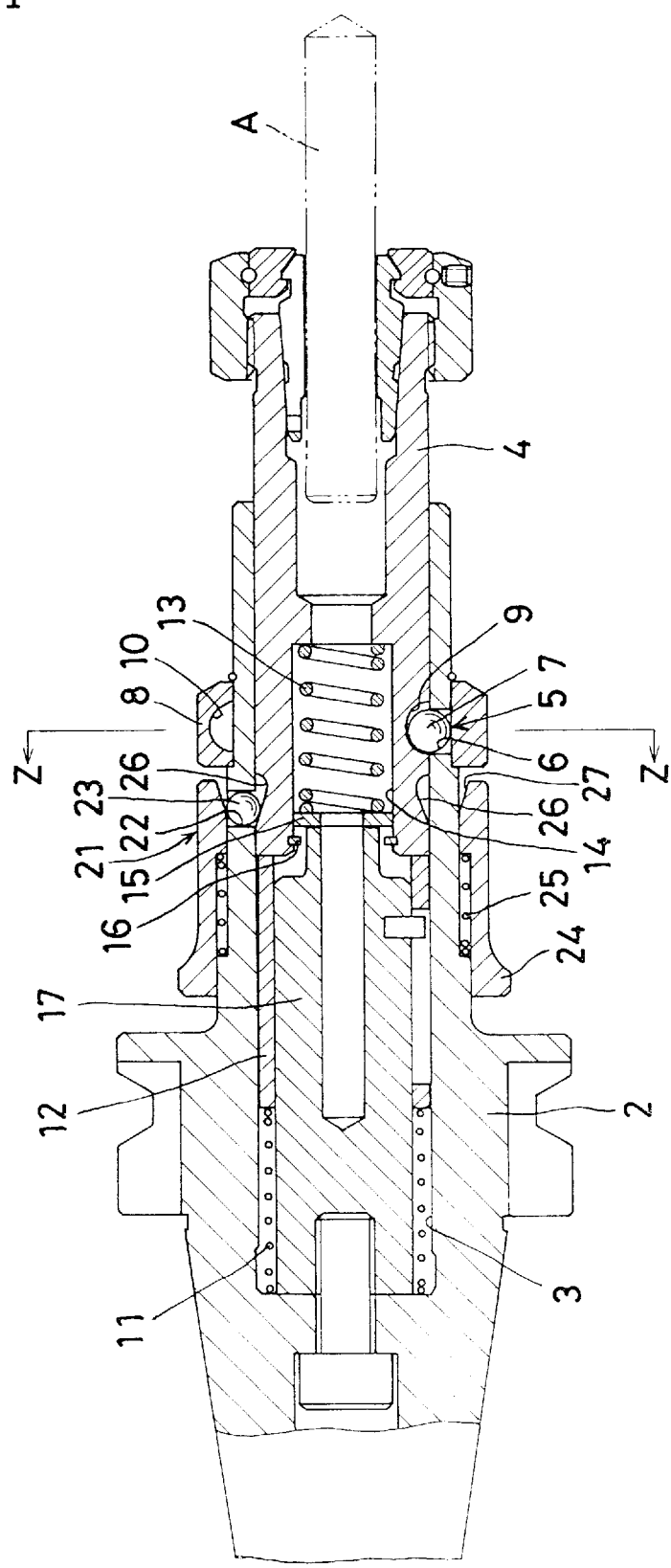
FIG. 4 is a vertical sectional side view showing another example of the first embodiment.
Figure 5:
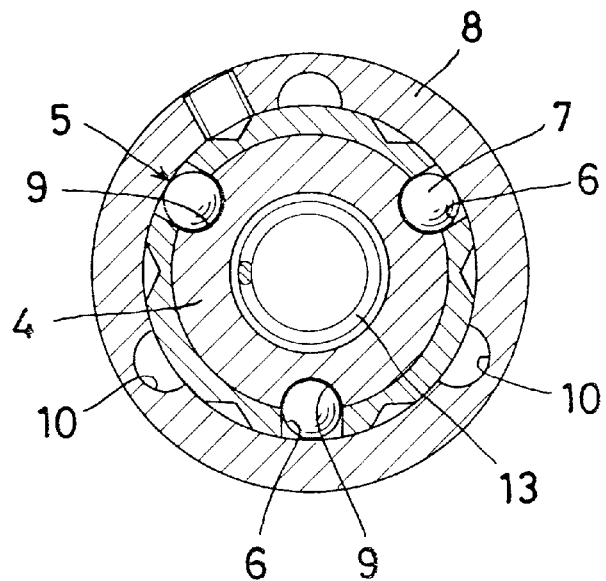
FIG. 5 is a cross sectional view taken along line Z—Z of FIG. 4.

The holder 4 has an unreplaceable structure in FIG. 1. However, for a replaceable (detachable) holder 4, fitting portions 10 for fitting about a half of the outer periphery of the balls 7 therein are disposed on an inner peripheral surface of the rotating cylinder 8, as shown in FIGS. 4 and 5. Rotation of the rotating cylinder 8 allows the fitting portions 10 to be aligned with the balls 7. The holder 4 is then pulled out, whereby the balls 7 are pushed away so that the balls 7 may be fitted into the fitting portions 10. The balls 7 are disengaged from the concavities 9, whereby the holder 4 can be removed for replacement.

The concave hole 3 as shown in FIG. 4 includes a cylindrical guard 12. With the fitting of the holder 4, the guard 12 is forced into the concave hole 3 while compressing a spring 11. With the removal of the holder 4, the guard 12 is pushed back by a compression force of the spring 11. The guard 12 prevents the balls 7 from falling away.

In addition, a pressing force is applied to the holder 4 in a direction of ejection.

The means for applying a protruding force may take various forms. As an example, a first spring 13 is incorporated in a bottom of the concave hole 3 as shown in FIG. 1 so that the first spring 13 is compressed by the distal end of the attached holder 4. As another example, a hole 14 is disposed from the distal end to the tip end of the holder 4 as shown in FIG. 4. The first spring 13 and a seat 15 are fittingly mounted in sequence in this hole 14. A capture ring 16 prevents the seat 15 from falling away. The tip end of a protruding member 17 protruding forward (toward the holder 4) from the bottom of the concave hole 3 is brought into contact with the seat 15. At the time of the completion of the attachment of the holder 4, the first spring 13 is compressed while forcing the seat 15.

The pressing force is then applied to the holder 4 in the direction of ejection by the compressed first spring 13. The holder 4 is stopped at the fixed position by the contact between the ball 7 and the longitudinal edge (i.e. the edge on the longitudinal axis) of the concavity 9 of the transfer mechanism 5 on the distal end side of the holder 4. The stopped holder 4 is allowed to slide in the direction in which it is fitted (where an amount of slide is equal to a clearance between the ball 7 and the longitudinal edge of the concavity 9 on the side which the cutting tool A protrudes toward).

The base body 2 includes a lock mechanism 21 for maintaining the holder 4 fitted against the pressing force of the first spring 13 and being capable of unlocking the fitted holder 4 by an external operation.

As shown in FIGS. 1 and 4, the above-described lock mechanism 21 comprises through holes 22 which are equally spaced on the peripheral surface of the base body 2 so that they may communicate with the outer periphery of the base body 2 and the concave hole 3; balls 23 which are fitted in the through holes 22 (so that a partial peripheral surface of each ball 23 may protrude from the outer periphery of the base body 2 and the inner peripheral surface of the concave hole 3); a cylindrical slider 24 which is slidably mounted outside the base body 2 so that the tip end thereof (toward the cutting tool A) may cover the ball 23; a spring 25 having its ends engaged with the base body 2 and the slider 24, respectively, and exerting a pressing force on the slider 24 toward the cutting tool A; tapered grooves 26 for fitting the balls 23 therein, which is disposed in portions aligned with the ball 23 in the outer peripheral surface of the holder 4 so as to be shallower at the position closer to the distal end of the holder 4; and a tapered portion 27 which is disposed in the inner periphery on the tip end of the slider 24 so that the balls 23 may be forced as the slider 24 slides toward the cutting tool A. When the force for sliding the holder 4 in the direction of fitting while compressing the first spring 13 is exerted on the holder 4, the contact between the balls 23 and the tapered grooves 26 as shown in FIG. 7(I) moves from the shallow portion to the deep portion.

Figure 7:
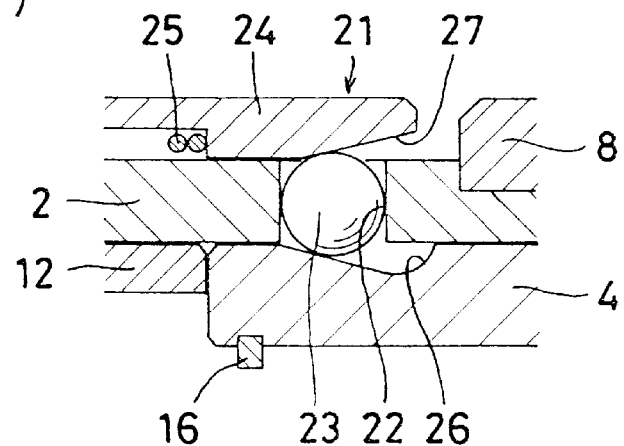
FIG. 7 shows a function of the lock mechanism.
Figure 7:
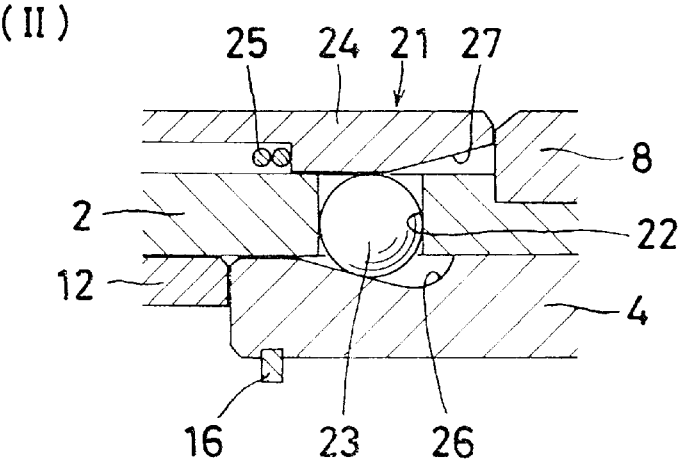
Figure 7:
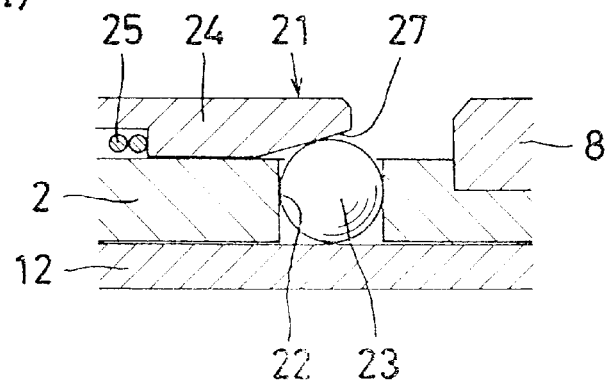

With the movement, the slider 24 is then slid toward the cutting tool A through the spring 25, while the balls 23 are forced by the tapered portion 27. The inner peripheral surface of the slider 24 comes into contact with the balls 23. Consequently, the as-forced balls 23 are maintained (as shown in FIG. 7(II)). That is, in this state, the slider 24 is automatically locked so as to keep the balls 23 forced into the holes.

For unlocking the slider 24, the slider 24 is manually pushed back in the direction opposite to the cutting tool A.

Then, the holder 24 slid in the direction of ejection by the first spring 13 with an increased compression force. This sliding allows the contact between the balls 23 and the tapered grooves 26 to move from the deep portions to the shallow portions, while the balls 23 are pushed out. Finally, the original condition is recovered.

Figure 6:
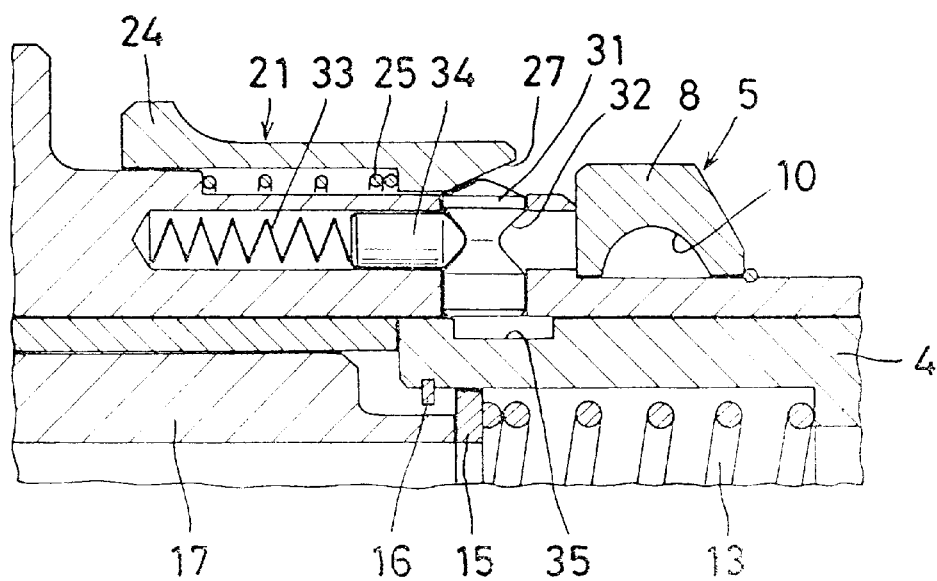
FIG. 6 is an enlarged vertical sectional side view showing another example of a lock mechanism.

As shown in FIG. 6, the tapered groove 26 and the ball 23 may be replaced by a pin (or a block) 31 fittingly inserted in the through hole 22 instead of the ball; a tapered groove 32 in the outer periphery of this pin 31; a protruding shaft 34 to which a protruding force is applied by a spring 33 so that the angled tip end of the shaft 34 is in contact with the tapered groove 32; and a circular groove 35 in the outer peripheral surface of the holder 4. Thereby, the pin 31 may be dropped into the circular groove 35 so as to maintain the fitting of the slider 24.

The guard 12, which is pushed out by pulling out the holder 4 (as shown in FIG. 7(III)), also prevents the balls 23 and 7 from falling away.

In the example shown, the above-mentioned base body 2 is rotated with a tapered portion of its base end fitted in the tapered hole of the spindle 1. However, the base body 2 may be rotated together with the spindle 1 by means of other mountings.

In the constitution as described above, if the pressure exceeds a constant pressure due to the influence of the life of the cutting tool A, the working condition, the working environment or the like, the compression acts on the holder 4 and the action allows the holder 4 to slide in the direction of fitting.

The holder 4 is then locked in the base body 2 by the lock mechanism 21, so that the holder 4 is kept fitted.

That is, when the cutting tool A is pulled out from a product after the completion of the work, the length (overall length) of the cutting tool A from the distal end to the tip end is shorter than the initial length by an amount of slide of the holder 4. Thus, the reduction in the length is visually checked. For example, a check is made so as to see whether or not the clearance between the opposite ends of the rotating cylinder 8 and the slider 24 is present. That is, the check is accomplished by seeing that the fixed clearance shown in FIG. 7(I) is absent during the lock as shown in FIG. 7(II). Alternatively, the reduction is checked by a method in which the outer peripheral colored portion of the base body 2 is concealed by the locked slider 24 in accordance with the above-described relationship. Alternatively, the reduction is checked every time by the machine with an automatic detecting device (touch sensor). In this manner, the operation of the machine is stopped.

Defective products can therefore be discovered immediately after the work has been carried out.

Figure 8:
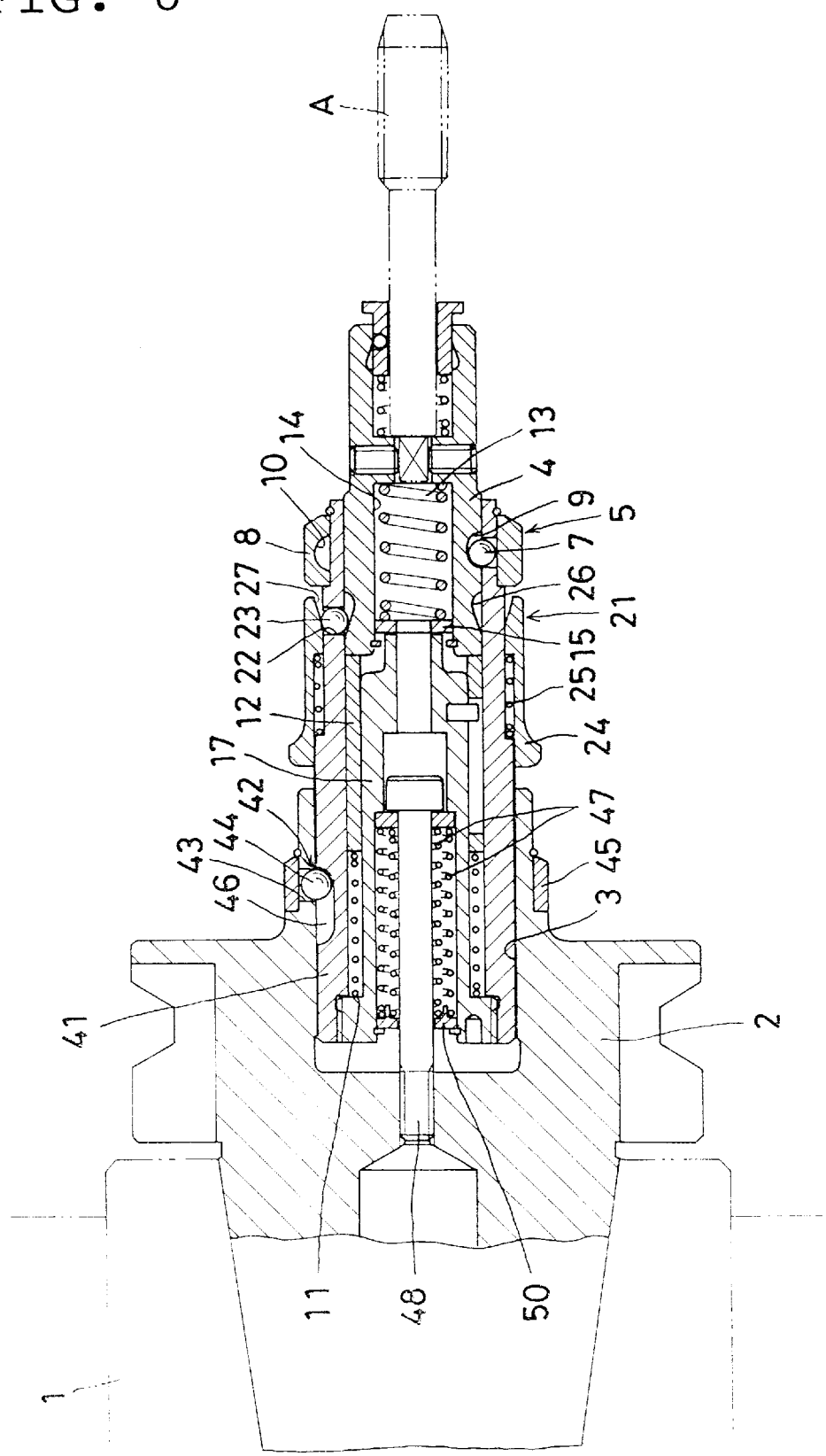
FIG. 8 is a partially cut-away side view showing a second embodiment.

In a second embodiment of this invention, as shown in FIG. 8, a cylindrical body 41 is slidably inserted in the concave hole 3 of the base body 2. In this cylindrical body 41, a transfer engagement mechanism 42 permits a constant slide of the cylindrical body 41 into the base body 2 and transfers the rotation of the base body 2 to the cylindrical body 41.

The above-mentioned transfer engagement mechanism 42 comprises through holes 43 which are equally spaced on the outer peripheral surface of the base body 2 so that the outer peripheral surface of the base body 2 may communicate with the inner peripheral surface of the concave hole 3; balls 44 fitted in the through holes 43; a cover 45 which is mounted outside the base body 2 so that the balls 44 may not escape outward; and elliptic grooves 46 which are equally spaced in the same manner as the balls 44 on the outer peripheral surface of the cylindrical body 41 and which are arranged along the axis of the cylindrical body 41 so that a partial outer periphery of the balls 44 may be fitted therein. The rotation of the base body 2 is transferred to the cylindrical body 41 through the balls 44. The cylindrical body 41 slides with the balls 44 in the grooves 46.

The transfer engagement mechanism 42 is not limited to the above-described constitution. For example, the ball may be replaced by the pin or the block. In short, any constitution will do as long as the cylindrical body 41 can be rotated with the base body 2 and the cylindrical body 41 can constantly slide into the base body 2.

The holder 4 having the cutting tool A is also inserted in the cylindrical body 41. The rotation is thus transferred from the cylindrical body 41 to the holder 4 through the transfer mechanism 5 permitting a predetermined slide of the holder 4.

Since the aforementioned transfer mechanism 5 is the same as in the first embodiment, the description is omitted.

Of course, the means described in the first embodiment may be employed in order that the holder 4 is attachable and detachable to/from the cylindrical body 41.

Since the means for obtaining the compression pressure of the first spring 13 incorporated in the distal end of the holder 4, i.e., the compression by the protruding member 17 is the same as in the first embodiment, the description is omitted.

Furthermore, the force for pulling the cylindrical body 41 back toward the bottom of the concave hole 3 by a second spring 47 is applied to the cylindrical body 41. Typically, the balls 44 come into contact with the ends of the grooves 46 on the side of the holder 4, so that the cylindrical body 41 is at a stop position.

In the case shown, the second spring 47 secures the distal end of the cylindrical protruding member 17 fitted in the cylindrical body 41 to the distal end of the cylindrical body 41. A stem member 48, which is fixed by screwing it into the bottom of the concave hole 3, is also fitted into the protruding member 17. One end of each of two (inner and outer) coil springs of the second spring 47 fittingly mounted to the stem member 48 is in contact with the tip end of the stem member 48. The other end of each of the coil springs is in contact with a ring 50 in the distal end of the protruding member 17.

The cylindrical body 41 also includes the lock mechanism 21 for maintaining the fitted holder 4.

Since the above-described lock mechanism 21 is the same as in the first embodiment, the description is omitted.

In the constitution as described above, the trouble occurring during work using the cutting tool A can be detected by the lock of the fitted cutting tool in the same manner as in the first embodiment. The tension is ensured by a set amount of slide of the cylindrical body 41 in the direction of ejection due to the transfer engagement mechanism 42.

Thus, when the cutting tool A is a tap, the tension and the compression are ensured and therefore, there is no trouble with the tap work operation.

Figure 9:
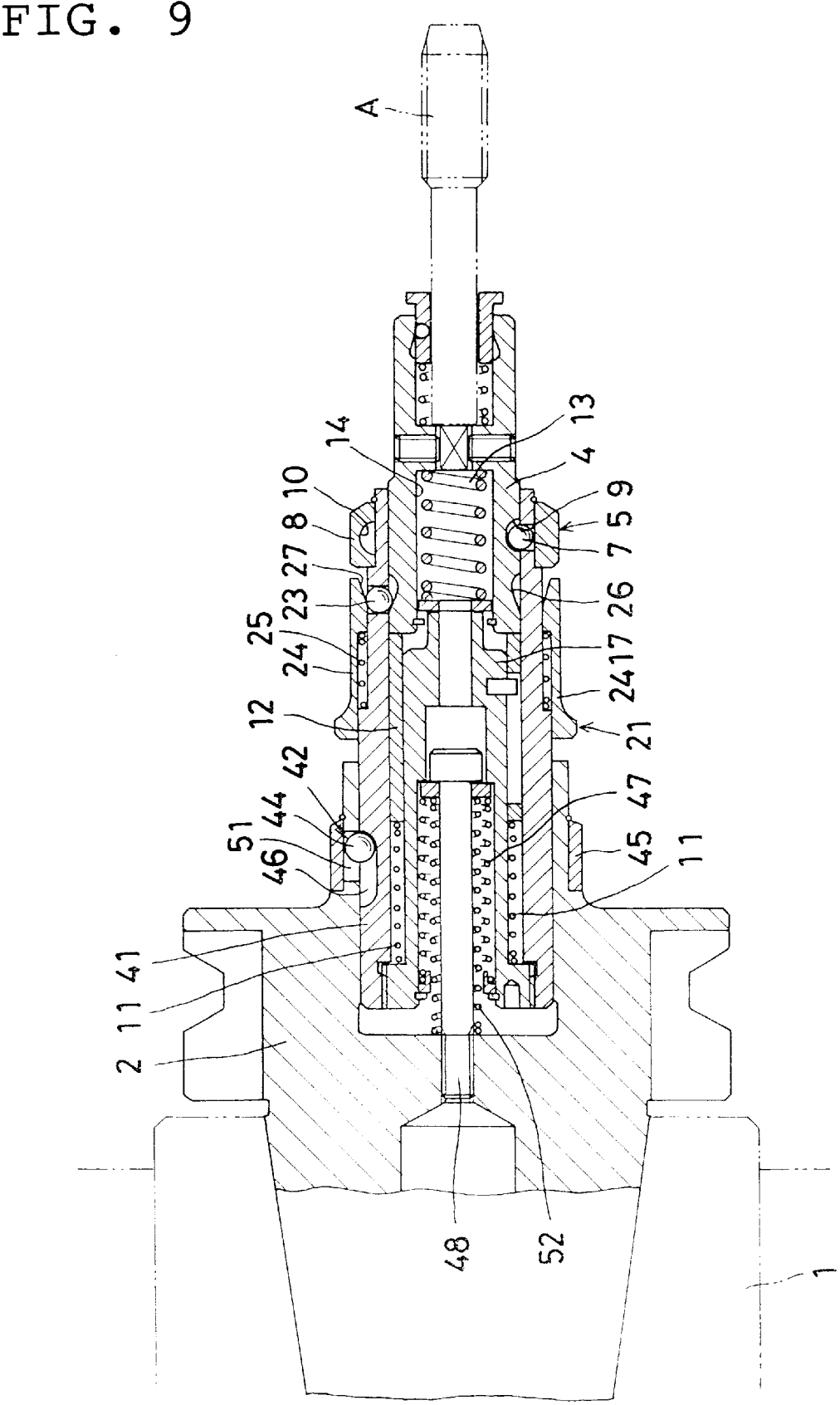
FIG. 9 is a partially cut-away side view showing a third embodiment.

In a third embodiment of this invention, as shown in FIG. 9, the through hole for fitting the ball 44 therein of the transfer engagement mechanism 42 of the third embodiment is an elliptic permitting portion 51 so that it may permit the ball 44 to move by a constant amount toward the bottom of the concave hole 3 during the action of the compression.

Besides the fact that the cylindrical body 41 is pulled back by the second spring 47, both ends of a third spring 52 are brought into contact with the bottom of the concave hole 3 and the tip end of the stem member 48. Thereby, the force is also applied to the cylindrical body 41 in the direction of ejection by this third spring 52.

That is, the cylindrical body 41 is typically stopped at the neutral position by the second spring 47 and the third spring 52.

Therefore, even if the compression force is exerted on the holder 4 keeping the cutting edge (tap) A fitted by the lock mechanism 21 due to the fitting of the slider 4, the cylindrical body 41 is slid in the range of the permitting portion 51. Thus, there are no trouble and damage with/to the lock mechanism 21 and the cutting tool A, i.e. the tap. Accordingly, the permitting portion 51 functions as a safety device.

The cutting tool A is held in the holder 4 by a shown collet method or a known holding method for the tap only. The compression of the first spring 13 of the embodiments is set and incorporated in accordance with the size (diameter) of the cutting tool, a cutting resistance or the like.

A chuck according to this invention is constituted as previously discussed. Thus, the defective workpieces can be rapidly surely discovered by maintaining the fitted cutting tool.

Moreover, the transfer engagement mechanism permitting a constant slide of the cylindrical body enables the discovery of the defective workpieces by maintaining the fitted tap while keeping the function of the compression and tension during use of the cutting tool, i.e. the tap.

In addition, the permitting portion further improves the safety. The trouble and damage with/to the tap can be thus eliminated.

That which is claimed:

1. A chuck comprising:
   a base body for rotating with a spindle of a machine tool;
   a concave hole disposed in a stem of said base body and open at the end surface thereof;
   a holder inserted in said concave hole with a spring pressing said holder in a direction of ejection from said concave hole, said holder being operable for holding an appropriate cutting tool on the end thereof;
   a transfer mechanism for permitting a predetermined length of slide of said holder into said base body and for transferring the rotation of said base body to said holder; and
   a lock mechanism for maintaining said holder fitted in said base body against said pressing force, said lock mechanism capable of unlocking said fitted holder.

2. The chuck according to claim 1, wherein said transfer mechanism has a function of attaching said holder to said concave hole and detaching said holder from said concave hole.

3. A chuck comprising:
   a base body for rotating with a spindle of a machine tool;
   a concave hole disposed in a stem of said base body and open at the end thereof;
   a cylindrical body slidably inserted in said concave hole;
   a transfer engagement mechanism for permitting a constant slide of said cylindrical body into said base body and for transferring the rotation of said base body to said cylindrical body;
   a holder for slidably fitting itself into said concave hole from the end of said cylindrical body and for holding an appropriate cutting tool on the end thereof;
   a transfer mechanism for permitting a predetermined length of slide of said holder into said cylindrical body and for transferring the rotation of said cylindrical body to said holder;
   a first spring disposed in a distal end of said holder so that it can receive an applied pressure from the distal end side of said holder;
   a lock mechanism for maintaining said holder fitted in said cylindrical body against a compression force of said first spring, said lock mechanism capable of unlocking said fitted holder;
   a protruding member protruding from an inside of said cylindrical body toward the distal end of said holder, said protruding member having the protruding end in contact with said first spring on the side at which said first spring receives the applied pressure; and
   a second spring for pushing said cylindrical body back to a bottom side of said concave hole.

4. A chuck comprising:
   a base body for rotating with a spindle of a machine tool;
   a concave hole disposed in a stem of said base body and open at the end thereof;
   a cylindrical body slidably inserted in said concave hole;
   a transfer engagement mechanism for permitting a constant slide of said cylindrical body into said base body and for transferring the rotation of said base body to said cylindrical body;
   a permitting section disposed in said base body so that said transfer engagement mechanism can slide in a constant range toward the distal end of said cylindrical body;
   a holder for slidably fitting itself into said concave hole from the end of said cylindrical body and for holding an appropriate cutting tool on the end thereof;
   a transfer mechanism for permitting a predetermined length of slide of said holder into said cylindrical body and for transferring the rotation of said cylindrical body to said holder;

a first spring disposed in the distal end of said holder so that it can receive an applied pressure from the distal end side of said holder;

a lock mechanism for maintaining said holder fitted in said cylindrical body against a compression force of said first spring, said lock mechanism capable of unlocking said fitted holder;

a protruding member protruding from an inside of said cylindrical body toward the distal end of said holder, said protruding member having the protruding end in contact with said first spring on the side at which said first spring receives the applied pressure;

a second spring for pushing said cylindrical body back to a bottom side of said concave hole; and a third spring for pushing back said cylindrical body in the direction in which said protruding member protrudes.

5. The chuck according to claim 3, wherein said transfer mechanism has a function of attaching said holder to said cylindrical body and detaching said holder from said cylindrical body.

6. The chuck according to claim 1, wherein said holder incorporates a protruding force applying member for obtaining a predetermined compression pressure.

7. The chuck according to claim 4, wherein said transfer mechanism has a function of attaching said holder to said cylindrical body and detaching said holder from said cylindrical body.

8. The chuck according to claim 3, wherein said holder incorporates a protruding force applying member for obtaining a predetermined compression pressure.

9. The chuck according to claim 4, wherein said holder incorporates a protruding force applying member for obtaining a predetermined compression pressure.

* * * * *